(12) United States Patent
Tao (10) Patent No.: US 8,204,202 B2
(45) Date of Patent: Jun. 19, 2012

(54) METHOD AND SYSTEM FOR PLAYING RINGING BACK TONE IN IMS NETWORK

(75) Inventor: Jiaqi Tao, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 412 days.

(21) Appl. No.: 12/493,675

(22) Filed: Jun. 29, 2009

(65) Prior Publication Data

US 2009/0262916 A1 Oct. 22, 2009

Related U.S. Application Data (63) Continuation of application No. PCT/CN2008/070519, filed on Mar. 18, 2008.

(30) Foreign Application Priority Data

May 23, 2007 (CN) .......................... 2007 1 0103756

(51) Int. Cl.
*H04M 3/42* (2006.01)
*H04M 1/00* (2006.01)
*H04M 3/00* (2006.01)

(52) U.S. Cl. ......... 379/207.16; 379/201.01; 379/201.07; 379/372; 379/373.02

(58) Field of Classification Search ............. 379/207.16, 379/372, 201.01, 201.07, 201.08, 373.02
See application file for complete search history.

(56) References Cited

U.S. PATENT DOCUMENTS

| 2006/0210033 | A1 | 9/2006 | Grech et al. |
| 2007/0127655 | A1 | 6/2007 | Jung et al. |
| 2007/0286401 | A1* | 12/2007 | Siddiqui et al. ............... 379/372 |
| 2008/0045239 | A1 | 2/2008 | Sun |

FOREIGN PATENT DOCUMENTS

| CN | 1852360 A | 10/2006 |
| CN | 1852365 A | 10/2006 |
| CN | 1866930 A | 11/2006 |
| EP | 1 517 527 A1 | 3/2005 |
| JP | 2005277450 A | 10/2005 |
| KR | 1020060072168 A | 6/2006 |
| KR | 10-2007-0049032 | 5/2007 |
| WO | 2004/032547 A1 | 4/2004 |
| WO | WO 2006/135592 A1 | 12/2006 |

(Continued)

OTHER PUBLICATIONS

International Search Report issued in corresponding PCT Application PCT/CN2008/070519; mailed Jun. 26, 2008.

(Continued)

*Primary Examiner* — Thjuan K Addy
(74) *Attorney, Agent, or Firm* — Brinks Hofer Gilson & Lione (57) ABSTRACT

A method for playing a Ring Back Tone (RBT) in an IP Multimedia Subsystem (IMS) is disclosed. The method includes: after the network receives an RBT playing request, obtaining the current status information of the called user; determining an RBT ID corresponding to the called user ID and the current status information of the called user according to the corresponding relationship; and playing the RBT to the calling user. A system and Multimedia Ring Back Tone Application Server (MRBT AS) for playing an RBT in the IMS network are also provided. An RBT may be selected and played to the calling user according to the current status of the called user.

11 Claims, 6 Drawing Sheets

FOREIGN PATENT DOCUMENTS

WO      2007/030991 A1      3/2007

OTHER PUBLICATIONS

Supplementary Search Report issued in corresponding European Patent Application No. 08 715 255; issued Dec. 7, 2009.
International Preliminary Report on Patentability issued in corresponding PCT Application No. PCT/CN2008/070519; issued Nov. 24, 2009.
Office Action issued in corresponding Russian Patent Application No. 2009129528, mailed Jan. 19, 2011.
Office Action issued in corresponding Korean Patent Application No. 10-2009-7013759, mailed Feb. 8, 2011.
Office Action issued in corresponding Chinese Patent Application No. 200710103756.9, mailed Feb. 12, 2010.
Office Action issued in corresponding Mexican Patent Application No. MX/a/2009/007656, mailed May 18, 2011.
Office Action issued in corresponding Mexican Patent Application No. MX/a/2009/007656, mailed Nov. 17, 2011.
Office Action issued in corresponding Japanese Patent Application No. 2009-545807, mailed Apr. 4, 2012.

* cited by examiner

METHOD AND SYSTEM FOR PLAYING RINGING BACK TONE IN IMS NETWORK

CROSS-REFERENCE TO RELATED APPLICATIONS

The present application is a continuation application of PCT/CN2008/070519, filed Mar. 18, 2008, which claims the priority of Chinese Patent Application No. 200710103756.9, filed on May 23, 2007 with the Chinese Patent Office and titled "Method and System for Playing Ringing Back Tone in IMS Network", the contents of which are incorporated herein by reference in their entirety.

FIELD OF THE DISCLOSURE

The present disclosure relates to IP communication technologies, and in particular, to a method, system, and server for playing a Ring Back Tone (RBT) in an IP Multimedia Subsystem (IMS) network.

BACKGROUND OF THE DISCLOSURE

Currently, the IMS network may provide Session Initiation Protocol (SIP)-based RBT services and presence services.

The presence services provide current presence information of a presence service subscriber. The presence information may include multiple status information, including reachability, current communication mode, availability, mood, and location of a User Equipment (UE). A presence server stores and manages the presence information of the presence service subscriber. The presence information, such as location information, may be manually modified by the subscriber or updated by related network devices. The modified presence information may be notified by the presence server to presence service subscribers that subscribe to the presence information.

The RBT service allows mobile subscribers and fixed-line subscribers to customize a special RBT to replace a traditional one and play the RBT to calling users. In networks provided by different operators, the RBT service may be identified by different names.

The RBT customized by a subscriber may be an audio clip including music or pre-recorded voice information, or multimedia information including video, audio or other media. The RBT service subscriber may select an RBT file provided by a service provider or an operator through a Portal on the Internet, or upload an RBT file that the subscriber edits to the Internet, or copy RBTs of other subscribers for personal use with copyright permission. The RBT service subscriber may also set different policies for playing these RBT files. For example, the subscriber may play different RBT files in different time segments or play different RBT files to different calling users. When a calling user calls a subscriber who already applies for the RBT service, the calling user may see or hear the RBT file information selected by the subscriber, not the traditional tone.

Currently, the RBT playing policies set by RBT service subscribers are fixed in a fixed network or mobile network. A fixed RBT file is played to a fixed calling user or in a fixed time segment, or a group of fixed RBT files is played in random or cyclic mode. Even if a subscriber sets an RBT playing policy according to his or her presence status, the RBT file may not be determined according to the current presence status of the subscriber when the subscriber is called, because a Multimedia Ring Back Tone Application Server (MRBT AS) in the network may not obtain the current presence information of the called user. Thus, what the calling user obtains is the RBT information that is set by the called user for the particular time segment or the calling user, and not for the RBT information that is set according to the current presence status of the called user.

SUMMARY

Embodiments of the present disclosure provide a method, system and server for playing an RBT in the IMS network to solve a problem that the RBT is not be played according to the current status of a called user in the RBT service provided by the IMS.

A method for playing an RBT in the IMS network according to an embodiment of the present disclosure includes: obtaining current status information of a called user; determining an RBT identifier (ID) corresponding to the current status information of the called user according to corresponding relationship between status information of subscriber and RBT ID; and playing to a calling user an RBT corresponding to the RBT ID according to the RBT ID.

A system for playing an RBT in the IMS network according to an embodiment of the present disclosure includes:
a presence server, adapted to store and manage current status information of a subscriber;
a Multimedia Ring Back Tone Application Server (MRBT AS), adapted to obtain current status information of a called user, determine an RBT ID corresponding to the current status information of the called user according to corresponding relationship between status information of subscriber and RBT ID, and send the RBT ID as a notification message; and
a Media Resource Server (MRS), adapted to play an RBT identified by the RBT ID to a calling user after receiving the notification message sent from the MRBT AS.

An MRBT AS according to an embodiment of the present disclosure includes:
a management controlling module, adapted to notify an interface module of obtaining current status information of a called user after receiving an RBT playing request that carries a called user ID, and determine an RBT ID corresponding to the called user ID and the current status information of the called user according to corresponding relationship between the status information of the called user and the RBT ID;
the interface module, adapted to obtain the current status information of the called user from a presence server; and
a multimedia controlling module, adapted to notify the MRS of playing an RBT identified by the RBT ID to the calling user according to the RBT ID determined by the management controlling unit.

In the embodiments of the present disclosure, an RBT playing policy is stored in the network, where the RBT playing policy may include corresponding relationship among the called user ID, status information of the called user, and the RBT ID. After an RBT playing request that carries the calling user ID and the called user ID is received, the current status information of the called user is obtained; an RBT ID corresponding to the called user ID and the current status information of the called user is determined according to the corresponding relationship stored in the RBT playing policy; and then an RBT identified by the RBT ID is played to the calling user. The embodiments of the present disclosure implement the function of playing an RBT to the calling user according to the current status of the called user, thus enabling the subscriber to set services more flexibly and have a better experience.

DETAILED DESCRIPTION OF THE DISCLOSURE

An embodiment of the present disclosure provides a technical solution for playing an RBT in the IMS network. The technical solution combines the RBT service provided by the IMS network with the presence service so that the network may determine an RBT to be played according to the current status of the called user.

Figure 1:
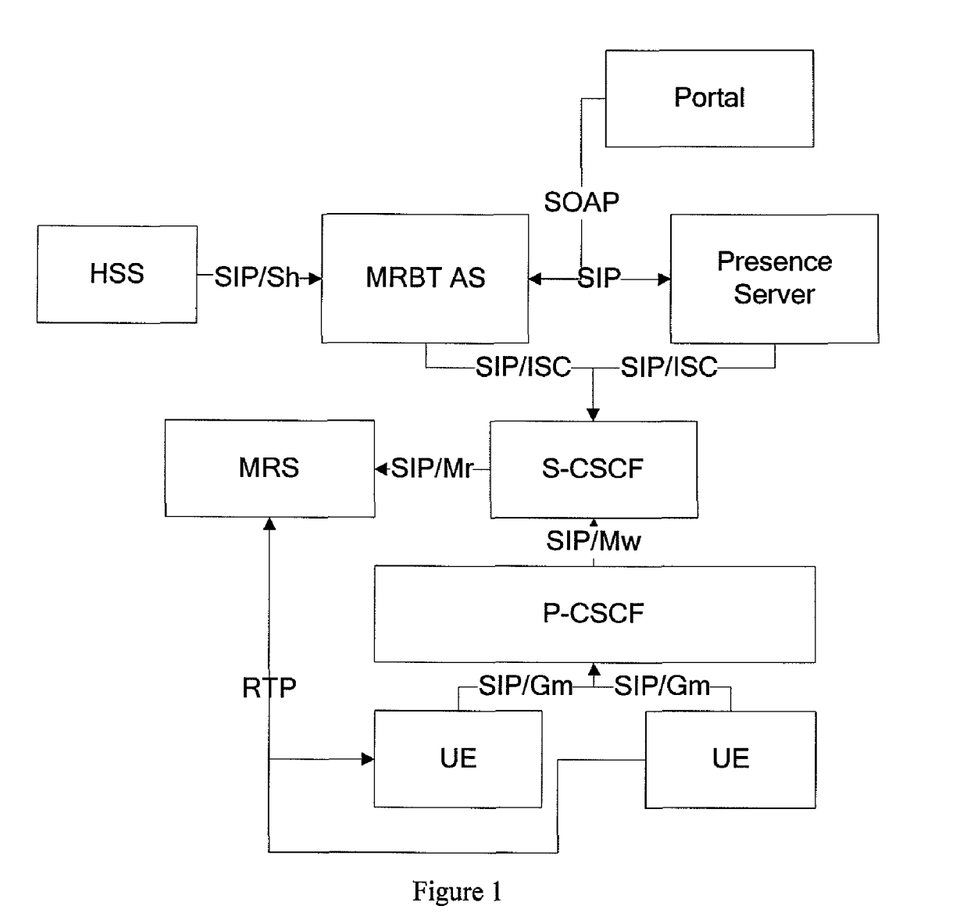
FIG. 1 is a networking diagram for implementing an RBT service according to an embodiment of the present disclosure.

FIG. 1 is a networking diagram of the technical solution, including following network entities.

A presence server is adapted to store and manage the status information of a presence service subscriber.

A Multimedia Ring Back Tone Application Server (MRBT AS) is adapted to provide an RBT service control process, including service control, selection of RBT playing policies, authentication and Call Detail Record (CDR) generation. The RBT service control process may include: obtaining the current status information of the called user, determining an RBT identifier (ID) corresponding to the current status information of the called user according to the corresponding relationship between the status information of subscriber and RBT ID, and notifying the MRS to play the associated RBT file corresponding to the RBT ID.

An MRS is adapted to store RBT files and play an RBT file corresponding to the RBT ID to the calling user;

A Proxy-Call Session Control Function (P-CSCF) entity is used by the subscriber to access the IMS.

A Serving-Call Session Control Function (S-CSCF) entity is adapted to control a session and service triggering and interact with the AS for service control.

A Home Subscriber Server (HSS) is adapted to uniformly manage subscription data of the subscribers.

A Portal is used to by the subscriber to set and manage his or her own RBT playing polices, uploads or subscribes to RBT files.

As shown in FIG. 1, an IMS Service Control (ISC) reference point is adapted to exchange messages between the CSCF and the AS via SIP. A reference point Sh is adapted to exchange messages between the HSS and the AS via a Diameter protocol providing authentication, authorization and charging services. A reference point Mr is adapted to exchange messages between the S-CSCF and the MRS via SIP. A reference point Mw is adapted to exchange messages between the CSCFs via SIP. A reference point Gm is adapted to exchange messages between a UE and the CSCF via SIP. The MRBT AS communicates with the Portal via a Simple Object Access Protocol (SOAP); and the MRS communicates with the UE via a Real-Time Transfer Protocol (RTP).

The presence server may communicate with the MRBT AS directly or indirectly through an Integrated Service Bus (ISB). The presence server may communicate with the MRBT AS via SIP or SOAP.

Figure 2:
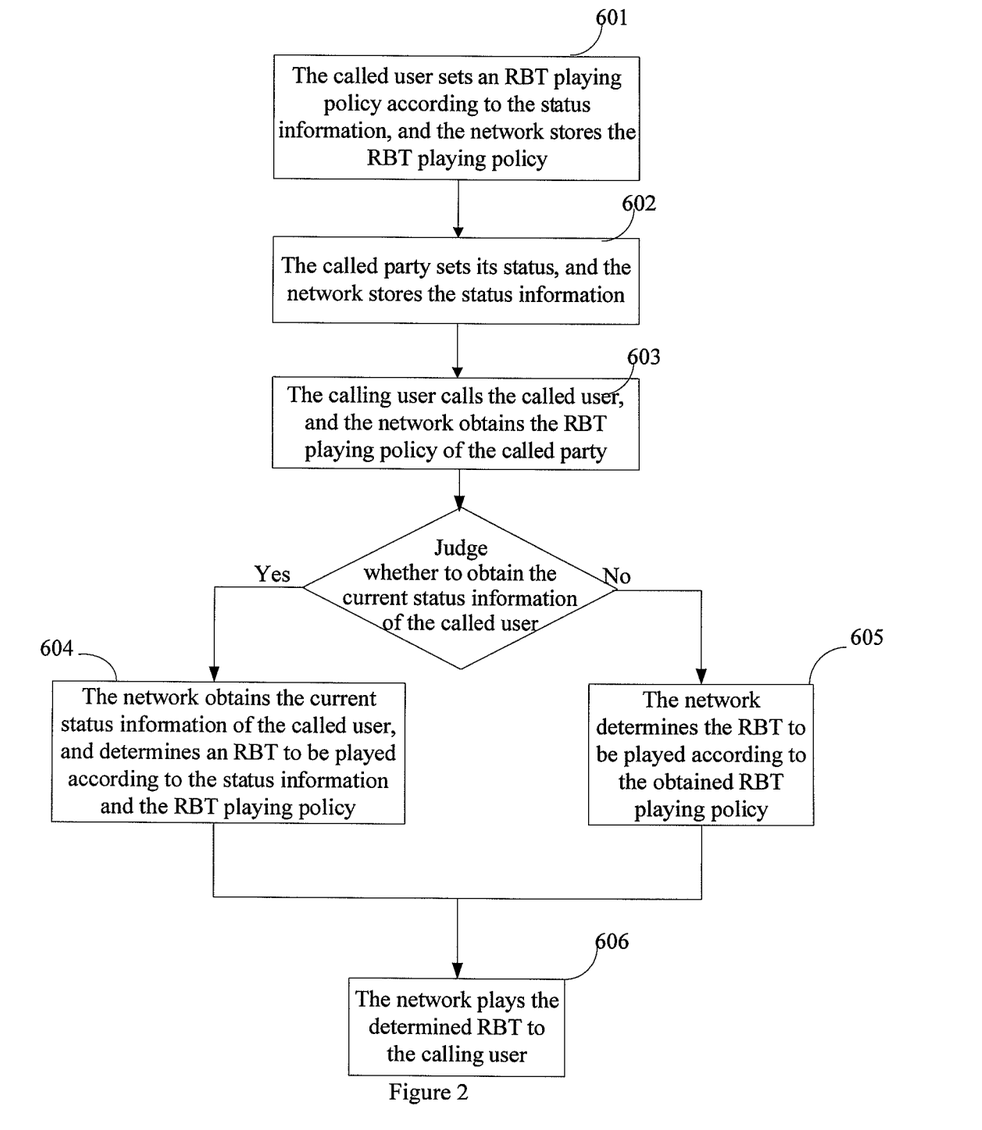
FIG. 2 is a flowchart of implementing an RBT service according to an embodiment of the present disclosure.

As shown in FIG. 2, the method provided according to an embodiment of the present disclosure includes the following steps.

Step 601: The called user sets an RBT playing policy according to the status information, and the network stores the RBT playing policy.

The called user may set the RBT playing policy through the Portal according to the status information, that is, the called user may select different RBTs according to different states. The Portal stores the RBT playing policy set by the subscriber in its own database, and the MRBT AS obtains the policy information when necessary; or, the Portal sends the RBT playing policy to the MRBT AS, and the MRBT AS stores the policy in its own database. The RBT playing policy may also be stored in other modes so long as the policy may be accessed by the MRBT AS.

The RBT playing policy may include the corresponding relationship among the subscriber ID, the status information of the subscriber and the RBT ID.

Preferably, the status information may include a presence type ID and a presence value, and the RBT playing policy may include a priority ID. The RBT playing policies set according to status information, for example, those set according to the time segment, calling user and group, have a higher priority than normal RBT playing policies. Thus, the priority mentioned herein refers to the priority relationship between multiple RBT playing policies set according to the status information. The policies may be in ascending or descending order, but should not be repeated. The presence type ID identifies type of status information set by the subscriber, for example, the location type or type of communication availability. The presence value is a value corresponding to the presence type. For example, when the presence type is the location type, the presence value may be roaming. The RBT ID may include a path for storing the RBT file. Thus, the RBT playing policy including a priority ID, a presence type ID, a presence value, and an RBT ID may be stored in the following quaternary group format:

|a Priority ID|a Presence type ID|a Presence value|an RBT ID|

Step 602: The status of the called user is set, and the network stores the status information.

When the called user changes a certain state, the called user may set its own status. For example, the subscriber sets his or her own status as "Driving" through a UE before driving, and the presence server in the network stores the corresponding relationship between the called user ID and the set status information. When the location of the called user changes, the network updates the status of the called user. For example, when the called user goes on a business trip or travels to another place, the location service provided by the network sets the status of the called user as "Roaming", and stores the corresponding relationship between the called user ID and the status information. The current status of the called user may not be single. For example, if the called user is driving in other places, the presence server may store multiple pieces of status information of the called user at the same time.

Step 603: The calling user calls the called user, and the network obtains the RBT playing policy of the called user and judges whether to obtain the current status information of the called user.

When the calling user calls the called user, the MRBT AS in the network may receive an RBT playing request from the called user if the called user is an RBT service subscriber. The RBT playing request carries the calling user ID and the called user ID.

The MRBT AS obtains the RBT playing policy including the called user ID from the Portal or the MRBT AS's database. If the obtained RBT policy is based on status information, that is, the RBT playing policy set by the subscriber according to the status information, the MRBT AS needs to obtain the current status information of the called user from the presence server, and the process goes to step 604; if the obtained RBT playing policy is not based on status information, the MRBT AS does not need to obtain the current status information of the called user, and the process goes to step 605. The method for judging whether the RBT playing policy is based on status information is to add an information type ID to the RBT playing policy. The information type ID identifies whether the RBT playing policy is based on the status information.

Step 604: The network obtains the current status information of the called user, and determines an RBT to be played according to the current status information and the RBT playing policy. Then, the process goes to step 606.

The MRBT AS in the network obtains the current status information of the called user by sending a request carrying the status of the called user ID to the presence server. After receiving the status request, the presence server determines the current status information corresponding to the called user ID according to the corresponding relationship between the stored called user ID and the status information.

After receiving the current status information of the called user returned by the presence server, the MRBT AS determines the RBT to be played according to the status information and the RBT playing policy based on status information of the called user that is obtained in step 603. The specific method is as follows. The MRBT AS determines an RBT ID corresponding to the called user ID and the current status information according to the corresponding relationship among the called user ID, the status information and the RBT ID stored in step 601, and takes the determined RBT as the RBT to be played. If the MRBT AS determines more than one RBT ID according to the corresponding relationship, the MRBT AS determines one RBT with a higher priority as the RBT to be played according to the priority ID in the RBT playing policy.

Step 605: The network determines the RBT to be played according to the obtained RBT playing policy.

If the obtained RBT playing policy is not based on the status information described in step 603, the MRBT AS determines the RBT ID to be played according to the obtained RBT playing policy. The RBT playing policy is set according to the time segment and calling user rather than presence information.

Step 606: The network plays the determined RBT to the calling user.

The MRBT AS sends the determined RBT ID to the MRS. The MRS obtains the RBT according to the RBT ID and plays the RBT to the calling user.

In this method, step 603 and step 604 may also be implemented as follows.

Firstly, the network obtains the current status information of the called user; then obtains the RBT playing policy set for the current status by the called user, where the RBT playing policy includes the current status; and determines the RBT to be played according to the obtained RBT playing policy. If the network fails to obtain the RBT playing policy set for the current status by the called user, the network obtains the RBT playing policy that is set by the called user according to the time segment and calling user rather than according to the presence information. Then, the network determines the RBT to be played according to the obtained RBT playing policy.

The method is hereinafter described with reference to a specific embodiment of the present disclosure.

Figure 3:
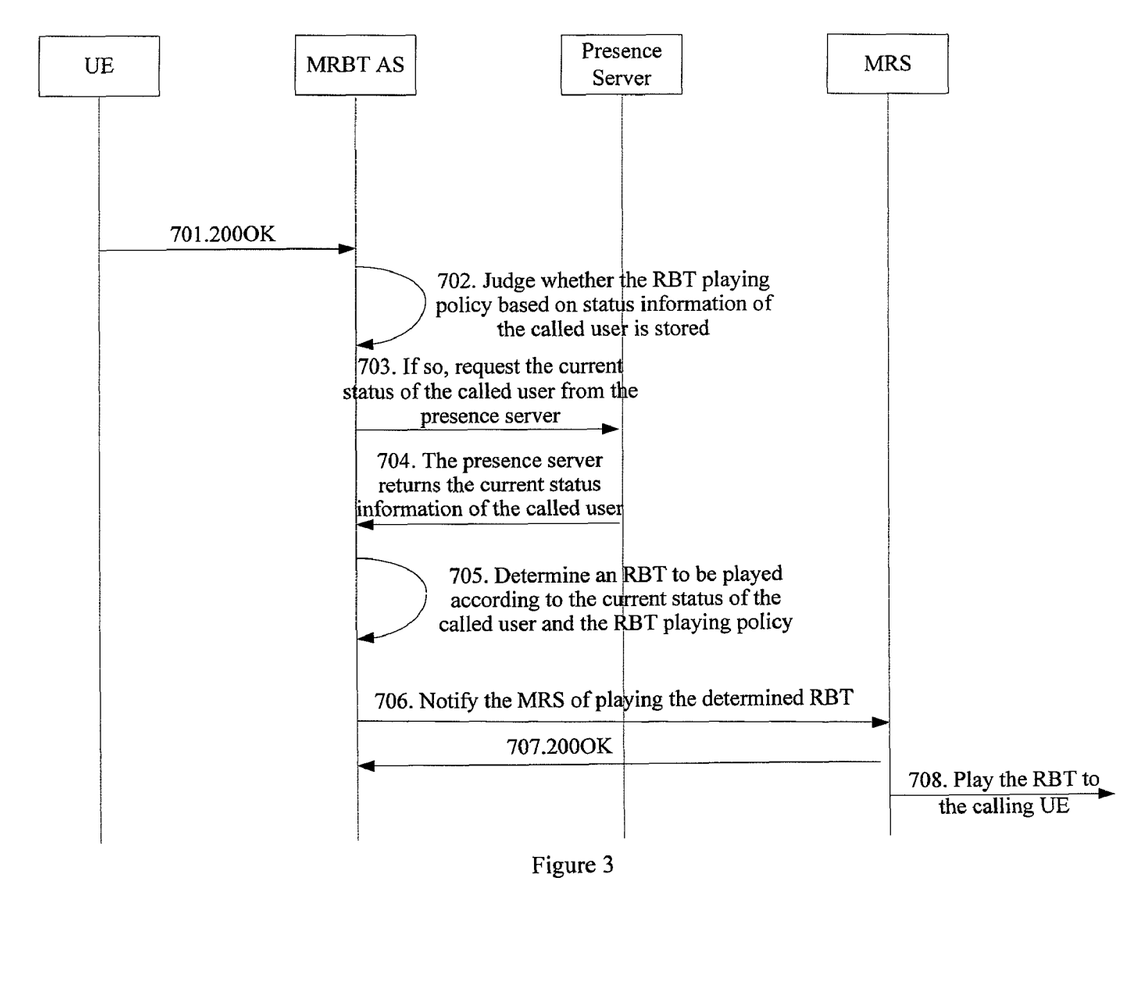
FIG. 3 is a signaling flowchart according to an embodiment of the present disclosure.

As shown in FIG. 3, in this embodiment, the called user already sets an RBT playing policy according to the current status, that is, the MBT AS in the network stores the corresponding relationship among the called user ID, the current status information and the RBT ID. A process of the calling user calls the called user, a signaling interacting process of the MRBT AS receives an RBT playing request from the called user, and the subsequent conversation or on-hook process are omitted in FIG. 3. FIG. 3 describes a process of selecting an RBT to be played. The process includes the following steps.

Step 701: The calling user calls the called user. The calling UE establishes a session and negotiates media. The MRBT AS receives an RBT playing request 200 OK (PRACK).

Step 702: The MRBT AS judges whether the RBT playing policy based on status information of the called user is stored in the MRBT AS.

Step 703: If the RBT playing policy based on status information of the called user is stored in the MRBT AS, the MRBT AS sends a status request message to the presence server.

This step involves a SIP transaction process that includes a SUBSCRIBE request message and corresponding response message. The following gives an example of interactive signaling of the SUBSCRIBE request message and corresponding response message.

---

Request message

SUBSCRIBE sip:sample01@imssample.com SIP/2.0
From: <sip:sample02@imssample.com>;tag=e16da6bf
To: <sip: sample01@imssample.com>
CSeq: 1 SUBSCRIBE
Accept: application/pidf+xml,multipart/related
Contact: <sip:1.211.66.15.32@211.66.15.212:5060;
transport=udp>
Expires: 0
Max-Forwards: 68
User-Agent: presence
Event: presence
Content-Length: 0

Response message

SIP/2.0 200 OK
Call-ID: b5f463899a6484267599416b173ec172@SIPA
From: <sip:sample01@imssample.com>;tag=e16da6bf
To: <sip:sample02@imssample.com>;tag=6f5c3e95
CSeq: 1 SUBSCRIBE
Expires: 0
Contact: <sip:211.66.15.150:5060>
Content-Length: 0

---

Step 704: The presence server returns a message including the current status information of the called user to the MRBT AS.

This step involves a SIP transaction process that includes a NOTIFY message and corresponding response message. The following gives an example of interactive signaling of the NOTIFY message and the corresponding response message. This example points out that the current subscriber is in the meeting state, and is only used to describe how to obtain the presence information.

Request message

NOTIFY sip:1.211.66.15.32@211.66.15.212:5060;transport=udp SIP/2.0
Call-ID: b5f463899a6484267599416b173ec172@SIPA
From: <sample01@imssample.com>;tag=6f5c3e95
To: <sample02@imssample.com>;tag=e16da6bf
CSeq: 1 NOTIFY
Event: presence
Contact: <sip:211.66.15.150:5060>
User-Agent: presence
Subscription-State: active
Content-Length: 423
Content-Type: application/pidf+xml
<?xml version="1.0" encoding="UTF-8"?>
<presence xmlns="urn:ietf:params:xml:ns:pidf"
xmlns:pdm="urn:ietf:params:xml:ns:pidf:data-model"
xmlns:rpid="urn:ietf:params:xml:ns:pidf:rpid"
xmlns:op="urn:oma:xml:prs:pidf:oma-pres"
xmlns:gp="urn:ietf:params:xml:ns:pidf:geopriv10"
xmlns:cl="urn:ietf:params:xml:ns:pidf:geopriv10:civicLoc"
xmlns:gml="urn:opengis:specification:gml:schema-xsd:feature:v3.0"
xmlns:lt="urn:ietf:params:xml:ns:location-type"
entity="sip:someone@example.com">
<pdm:person id="a1233">
<op:overriding-willingness>
<op:basic>open</op:basic>
</op:overriding-willingness>
<rpid:activities>
<rpid:meeting/>
</rpid:activities>
<rpid:place-type> <lt:office/> </rpid:place-type>
<rpid:status-icon>http://example.com/~my-icons/busy<rpid:status-icon>
<rpid:time-offset>120</rpid:time-offset>
<rpid:class>forfriends</rpid:class>
<pdm:note xml:lang="en">I'm in a boring meeting!!</pdm:note>
<pdm:timestamp>2006-02-22T20:07:07Z</pdm:timestamp>
</pdm:person>
</presence>
Response message SIP/2.0 200 OK
Call-ID: b5f463899a6484267599416b173ec172@SIPA
From: <sip:sample02@imssample.com>;tag=6f5c3e95
To: <sip:sample01@imssample.com>;tag=e16da6bf
CSeq: 1 NOTIFY
Content-Length: 0

Step 705: The MRBT AS determines the RBT to be played according to the returned current status information and the RBT playing policy based on status information of the called user.

Step 706: The MRBT AS notifies the MRS of playing the determined RBT to the calling user.

Step 707: The MRS sends a response message (200 OK) to the MRBT AS.

Step 708: The MRS plays the RBT to the calling user.

In the preceding process, the INFO request is a kind of SIP extended message. Refer to RFC 2976 for the definition. In the INFO message body, the media playing information is specified to notify the MRS of playing media.

In this embodiment, if the MRBT AS stores the RBT playing policy based on the status information of the called user, after receiving the RBT playing request, the MRBT AS obtains the current status information of the called user from the presence server via an SIP message interaction, determines the RBT to be played according to the current status information and the stored RBT playing policy, and notifies the MRS of playing the determined RBT to the calling user. The preceding solution satisfies the requirements of the subscriber for setting an RBT playing policy according to his or her current status. If the called user sets the RBT playing policy based on status information, the MRBT AS determines the RBT to be played to the calling user according to the current status information presence server and in combination with the stored RBT playing policy, and the current status information of the called user is obtained from the presence server. This method for playing an RBT to the calling user according to the status of the called user may dynamically select and play an RBT according to scenarios, thus improving the user experience.

Figure 4:
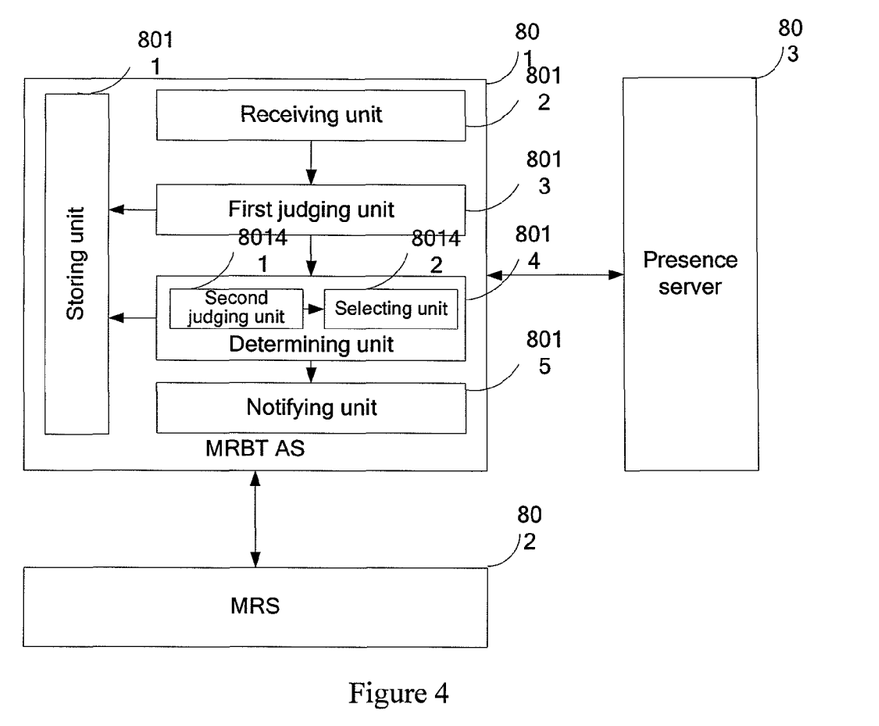
FIG. 4 shows a structure of a system according to an embodiment of the present disclosure.

FIG. 4 shows a system for playing an RBT in the IMS network according to an embodiment of the present disclosure. This system includes an MRBT AS 801, an MRS 802 and a presence server 803. The MRBT AS 801 is adapted to store an RBT playing policy of a subscriber. The RBT playing policy includes the corresponding relationship among the subscriber ID, the status information and the RBT ID. After receiving an RBT playing request including the calling user ID and the called user ID, if the MRBT AS 801 stores the RBT playing policy that includes the called user ID, the MRBT AS 801 obtains the current status information of the called user from the presence server 803, determines the RBT ID corresponding to the called user ID and the current status information of the called user according to the corresponding relationship, and notifies the MRS of playing the RBT identified by the RBT ID to the calling user according to the RBT ID. The MRS 802 is adapted to play the RBT identified by the RBT ID to the calling user after receiving the notification. The presence server 803 is adapted to store the current status information of the subscriber.

The MRBT AS 801 includes a storing unit 8011, a receiving unit 8012, a first judging unit 8013, a determining unit 8014 and a notifying unit 8015. The storing unit 8011 is adapted to store the RBT playing policy of the subscriber, and the RBT playing policy of the subscriber includes the corresponding relationship among the subscriber ID, the status information and the RBT ID. The receiving unit 8012 is adapted to receive the RBT playing request that includes the calling user ID and the called user ID. The first judging unit 8013 is adapted to judge whether the storing unit 8011 stores the RBT playing policy that includes the called user ID after receiving the RBT playing request. The determining unit 8014 is adapted to obtain the current status information of the called user from the presence server 803 after the first judging unit 8013 determines that the storing unit 8011 stores the RBT playing policy, and determines the RBT ID corresponding to the called user ID and the current status information of the called user according to the corresponding relationship stored in the storing unit 8011. The notifying unit 8015 is adapted to notify the MRS of playing to the calling user the RBT identified by the RBT ID determined by the determining unit 8014.

The status information may include presence information, location information, preferred communication mode or UE capability. The MRBT AS 801 and the presence server 8023 are connected directly or indirectly via the ISB. The MRBT AS 801 communicates with the presence server 803 via the SIP or SOAP protocol.

If the RBT playing policy also includes a priority ID, the determining unit 8014 includes a second judging unit 80141 and a selecting unit 80142. The second judging unit 80141 is adapted to determine one or more RBT IDs according to the corresponding relationship. The selecting unit 80142 is adapted to determine an RBT ID as the RBT ID corresponding to the called user ID and the current status information of the called user if the second judging unit 80141 determines one RBT ID according to the corresponding relationship; or select an RBT ID with a higher priority if the second judging unit 80141 determines more than one RBT ID according to the corresponding relationship, and determine the selected RBT ID as the RBT ID corresponding to the called user ID and the current status information of the called user.

Figure 5:
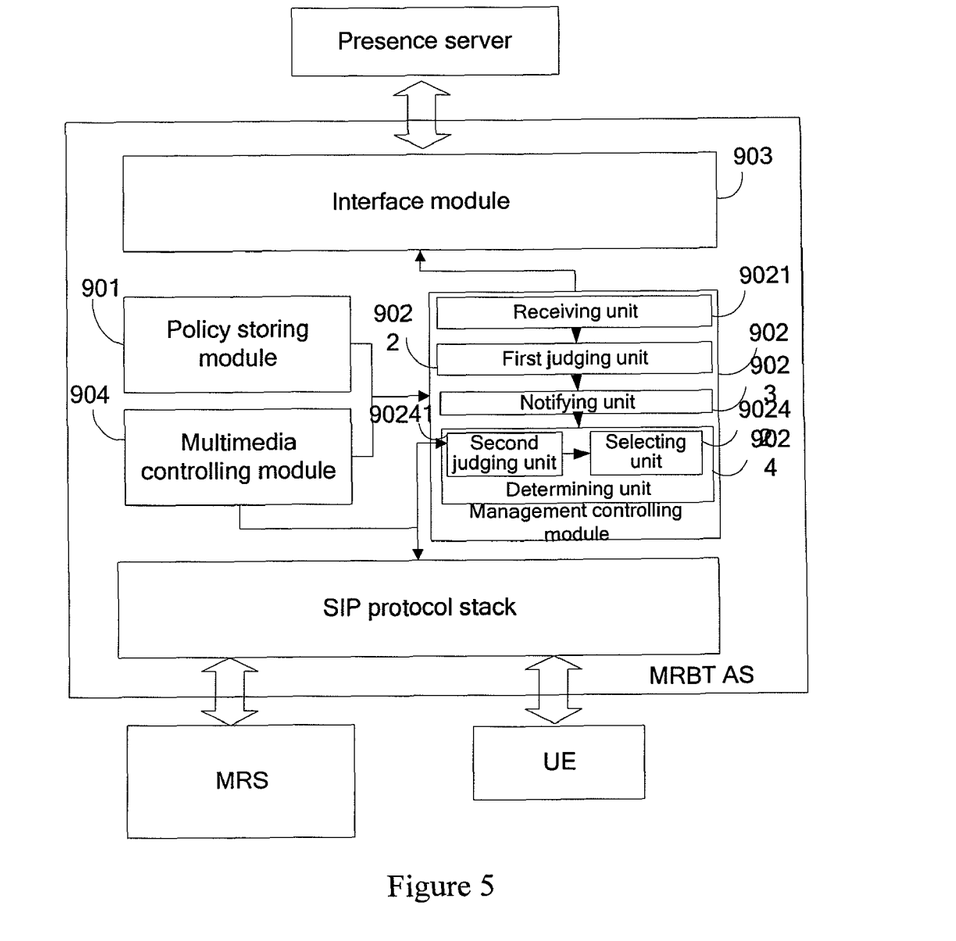
FIG. 5 shows a structure of an MRBT AS according to an embodiment of the present disclosure.

FIG. 5 shows an MRBT AS according to an embodiment of the present disclosure. The MRBT AS may be used in a system for playing an RBT in the IMS network. The MRBT AS may include a policy storing module 901, a management controlling module 902, an interface module 903 and a multimedia controlling module 904. The policy storing module 901 is adapted to store an RBT playing policy of a subscriber that includes the corresponding relationship among the subscriber ID, the status information and the RBT ID. The management controlling module 902 is adapted to: after receiving an RBT playing request that includes the calling user ID and the called user ID, notify the interface module of obtaining the current status information of the called user if the policy storing module 901 stores the RBT playing policy that includes the called user ID, and determine the RBT ID corresponding to the called user ID and the current status information of the called user according to the corresponding relationship stored by the policy storing module 901. The interface module 903 is adapted to obtain the current status information of the called user from the presence server 803. The multimedia controlling module 904 is adapted to notify the MRS of playing to the calling user the RBT identified by the RBT ID determined by the management controlling module 902.

The management controlling module 902 may include a receiving unit 9021, a first judging unit 9022, a notifying unit 9023 and a determining unit 9024. The receiving unit 9021 is adapted to receive the RBT playing request that includes the calling user ID and the called user ID. The first judging unit 9022 is adapted to judge whether the policy storing module 901 stores the RBT playing policy that includes the called user ID after receiving the request. The notifying unit 9023 is adapted to notify the interface module 903 of obtaining the current status information of the called user after determining that the policy storing module 901 stores the RBT playing policy that includes the called user ID. The determining unit 9024 is adapted to determine the RBT ID corresponding to the called user ID and the current status information of the called user according to the corresponding relationship stored by the policy storing module 901.

If the RBT playing policy also includes a priority ID, the determining unit 9024 may include a second judging unit 90241 and a selecting unit 90242. The second judging unit 90241 is adapted to determine one or more RBT IDs according to the corresponding relationship. The selecting unit 90242 is adapted to: determine the RBT ID as the RBT ID corresponding to the called user ID and the current status information of the called user if the second judging unit 90241 determines one RBT ID according to the corresponding relationship; or select an RBT ID with a higher priority if the second judging unit determines more than one RBT ID according to the corresponding relationship, and determine the selected RBT ID as the RBT ID corresponding to the called user ID and the current status information of the called user.

The RBT playing policy may be read and stored by the policy storing module 901 in the following quaternary group format:

|a Priority ID|a Presence status type ID|a Presence value|an RBT ID|

The meaning and use of each data item in this format may be the same as aforementioned. The use of a priority ID may have the following benefits: when the called user is in multiple states, for example, in the roaming and driving states, the status information of the called user that the MRBT AS receives from the presence server 803 may include multiple presence values. If multiple RBT playing policies are stored, multiple RBT IDs may be determined. The priority ID may be used to select an RBT with a higher priority and play the RBT with a higher priority to the calling user.

The preceding quaternary group may be replaced with a triple group or extended to a quintuple group or more by adding other auxiliary data.

Figure 6:
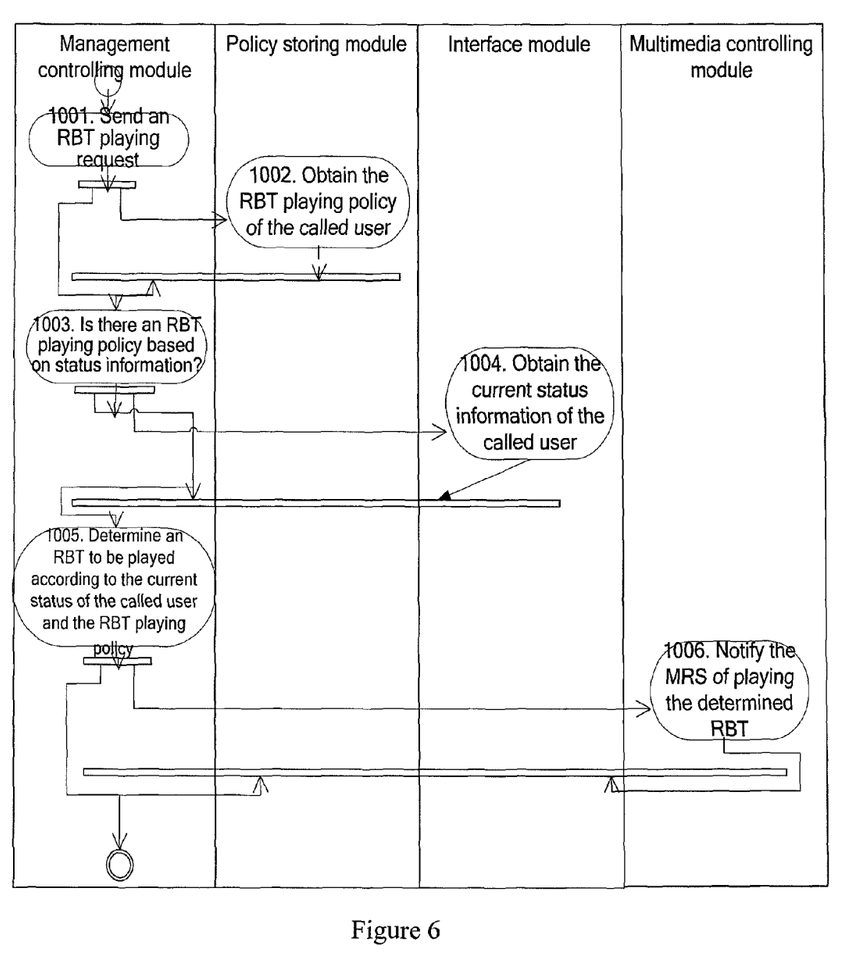
FIG. 6 shows a process of calling internal modules of the MRBT AS according to an embodiment of the present disclosure.

The following describes how the internal modules of the MRBT AS function (also the calling relationship of these modules) in the process of selecting and playing an RBT according to an RBT playing policy based on the set status information, with reference to FIG. 6.

Step 1001: The management controlling module 902 receives an RBT playing request from the subscriber.

Step 1002: The management controlling module 902 calls the policy storing module 901 to obtain from the database or other data storage media the RBT playing policy set by the subscriber through the Portal.

Step 1003: The management controlling module 902 judges whether an RBT playing policy based on status information is included in the obtained policies. FIG. 6 describes only this case.

Step 1004: The management controlling module 902 requests the current status information of the called user from the presence server 803 through the interface module 903.

Step 1005: The management controlling module 902 determines the RBT to be played according to the obtained current status information and the RBT playing policy.

Step 1006: The management controlling module 902 notifies the MRS of playing the RBT to the calling user through the multimedia controlling module 904.

In conclusion, according to the embodiments of the present disclosure, an RBT that is played to the calling user may be determined according to the current status of the called user and the set RBT playing policy. Thus, an RBT may be selected and played dynamically according to scenarios, and the user experience may be greatly improved.

It is apparent that those skilled in the art may make various modifications and variations to the present disclosure without departing from the spirit and scope of the present disclosure. The present disclosure is intended to cover these modifications and variations provided that they fall in the scope of protection defined by the following claims or their equivalents.

What is claimed is:

1. A method for playing a Ring Back Tone (RBT) in an IP Multimedia Subsystem (IMS) network, comprising:
   storing an RBT playing policy of the subscriber that comprises a corresponding relationship among a called user ID, status information of the called user; an RBT ID and a priority ID;
   obtaining current status information of a called user;
   determining an RBT identifier (ID) corresponding to the current status information of the called user according to a corresponding relationship between the status information of subscriber and RBT IDs; and
   obtaining an RBT identified by the RBT ID and playing the RBT identified by the RBT ID to a calling user according to the RBT ID;
   selecting one RBT ID with a higher priority when determining more than one RBT ID according to the corresponding relationship between the status information of the called user and the RBT ID; and
   playing the RBT identified by the RBT ID with a higher priority to the calling user according to the RBT ID with a higher priority.

2. The method of claim 1, wherein the status information comprises presence information, location information, preferred communication mode or User Equipment (UE) capability.

3. The method of claim 1, wherein before obtaining current status information of the called user, the method further comprises:
obtaining an RBT playing policy of the called user; and
judging whether or not the RBT playing policy is based on status information of the subscriber.

4. A system for playing a Ring Back Tone (RBT) in an IP Multimedia Subsystem (IMS) network, comprising:
a presence server, adapted to store and manage current status information of a subscriber;
a Multimedia Ring Back Tone Application Server (MRBT AS), adapted to obtain current status information of a called user, determine an RBT identifier (ID) corresponding to the current status information of the called user according to a corresponding relationship between the status information of the called user and an RBT ID, and send the determined RBT ID as a notification message, wherein the corresponding relationship is included in an RBT playing policy and the RBT playing policy is set by the called user; and
a Media Resource Server (MRS), adapted to play an RBT identified by the determined RBT ID to a calling user after receiving the notification message sent from the MRBT AS;
wherein the MRBT AS comprises:
a storing unit, adapted to store an RBT playing policy of the a subscriber that comprises a corresponding relationship among the called user ID, the status information of the called user, an RBT ID, and a priority ID;
a receiving unit, adapted to receive an RBT playing request that carries the called user ID;
a first judging unit, adapted to judge whether or not the storing unit stores the RBT playing policy that comprises the called user ID after the receiving unit receives the RBT playing request;
a determining unit, adapted to obtain the current status information of the called user from a presence server after the first judging unit determines that the storing unit stores the RBT playing policy that comprises the called user ID, determine the RBT ID corresponding to the called user ID and the current status information of the called user according to the corresponding relationship stored in the storing unit and wherein the determining unit comprises: a second judging unit, adapted to determine one or more RBT IDs according to the corresponding relationship; and a selecting unit, adapted to: after the second judging unit determines one RBT ID according to the corresponding relationship, determine one RBT ID as the RBT ID corresponding to the called user ID and the current status information of the called user; or after the second judging unit determines more than one RBT ID according to the corresponding relationship, select an RBT ID with a higher priority, and determine the selected RBT ID with a higher priority as the RBT ID corresponding to the called user ID and the current status information of the called user; and
a notifying unit, adapted to notify the MRS of playing to the calling user the RBT identified by the determined RBT ID determined by the determining unit.

5. The system of claim 4, wherein the status information comprises presence information, location information, preferred communication mode or User Equipment (UE) capability.

6. The system of claim 4, wherein the status information comprises presence information, location information, preferred communication mode or User Equipment (UE) capability.

7. The system of claim 4, wherein the MRBT AS and the presence server are connected directly or indirectly via an Integrated Service Bus.

8. The system of claim 4, wherein the MRBT AS and the presence server are connected directly or indirectly via an Integrated Service Bus.

9. The system of claim 7, wherein the MRBT AS communicates with the presence server via a Session Initiation Protocol (SIP) or a Simple Object Access Protocol (SOAP).

10. The system of claim 8, wherein the MRBT AS communicates with the presence server via a Session Initiation Protocol (SIP) or a Simple Object Access Protocol (SOAP).

11. A Media Ring Back Tone Application Server (MRBT AS), comprising:
a policy storing unit, adapted to store an RBT playing policy of the called user that comprises a corresponding relationship among the called user ID, the status information of the called user, the RBT ID, and a priority ID;
a management controlling module, adapted to notify an interface module of obtaining current status information of a called user after receiving an RBT playing request that carries a called user identifier (ID), and determine an RBT ID corresponding to the called user ID and the current status information of the called user according to a corresponding relationship between the status information of the called user and RBT IDs;
the interface module, adapted to obtain the current status information of the called user from a presence server; and
a multimedia controlling module, adapted to notify a Media Resource Server (MRS) of playing to a calling user an RBT identified by the RBT ID determined by the management controlling unit;
wherein management controlling module comprises
a receiving unit, adapted to receive an RBT playing request that carries the called user ID;
a first judging unit, adapted to judge whether the policy storing unit stores the RBT playing policy that comprises the called user ID after the receiving unit receives the RBT playing request; and
a notifying unit, adapted to notify the interface module of obtaining the current status information of the called user after the first judging unit determines that the policy storing module stores the RBT playing policy that comprises the called user ID
a determining unit, adapted to determine the RBT ID corresponding to the called user ID and the current status information of the called user according to the corresponding relationship stored in the policy storing module;
wherein the determining unit comprises: a second judging unit, adapted to determine one or more RBT IDs according to the corresponding relationship; and a selecting unit, adapted to: after the second judging unit determines one RBT ID according to the corresponding relationship, determine the one RBT ID as the RBT ID corresponding to the called user ID and the current status information of the called user; or after the second judging unit determines more than one RBT ID according to the corresponding relationship, select one RBT ID with a higher priority, and determine the selected RBT ID with a higher priority as the RBT ID corresponding to the called user ID and the current status information of the called user.

* * * * *